United States Patent [19]

Spietschka et al.

[11] Patent Number: 4,693,753
[45] Date of Patent: Sep. 15, 1987

[54] PIGMENTS OF THE QUINACRIDONEQUINONE SERIES, PROCESS FOR THEIR PREPARATION AND THEIR USE

[75] Inventors: Ernst Spietschka, Idstein; Frank Prokschy, Frankfurt am Main, both of Fed. Rep. of Germany

[73] Assignee: Hoechst Aktiengesellschaft, Fed. Rep. of Germany

[21] Appl. No.: 905,672

[22] Filed: Sep. 9, 1986

[30] Foreign Application Priority Data

Sep. 11, 1985 [DE] Fed. Rep. of Germany ....... 3532343

[51] Int. Cl.⁴ ............................................. C04B 14/00
[52] U.S. Cl. ................................ 106/288 Q; 106/309
[58] Field of Search ........................... 106/288 Q, 309

[56] References Cited

U.S. PATENT DOCUMENTS

| | | | |
|---|---|---|---|
| 3,298,847 | 1/1967 | Hanke et al. | 106/288 |
| 3,341,345 | 9/1967 | Ehrich et al. | 106/288 |
| 3,607,336 | 9/1971 | Jaffe | 106/288 Q |
| 3,686,009 | 8/1972 | West | 106/288 Q |
| 3,748,162 | 7/1973 | West | 106/288 Q |
| 3,897,411 | 7/1975 | Mory et al. | 106/288 Q |
| 4,025,518 | 5/1977 | Wriede | 546/57 |
| 4,197,404 | 4/1980 | Johnson | 106/288 Q |
| 4,286,998 | 9/1981 | Höltje et al. | 106/288 Q |
| 4,632,704 | 12/1986 | Bäbler | 106/288 Q |

OTHER PUBLICATIONS

Helvetica chimica Acta, vol. 61, Fasc. 3 (1978) Nr. 109, pp. 1146–1157, (Altiparmakian, R.).

Primary Examiner—Paul Lieberman
Assistant Examiner—Willie J. Thompson
Attorney, Agent, or Firm—Connolly and Hutz

[57] ABSTRACT

Pigments of the quinacridonequinone series comprising 99–30 mole percent of a quinacridonequinone of the formula (1)

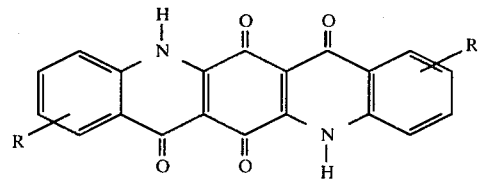

in which R denotes a hydrogen or chlorine atom or a methyl group, 0–60 mole percent of a quinacridone of the formula (2)

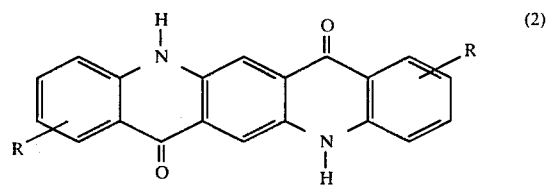

in which R has the above-mentioned meaning, and 1–10 mole percent of a 7,15-dihydro-pyrido-(2,1-b)-(1',2'; 1,2)-pyrimido-(4,5-g)-quinazoline-7,15-dione of the formula (3)

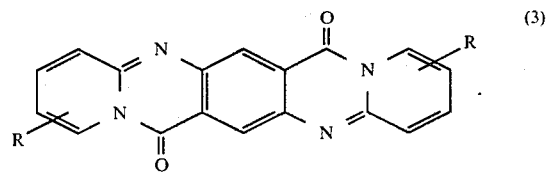

in which R has the above-mentioned meaning, the added compounds of the formulae (2) and (3) being present in the crystal lattice of the quinacridonequinone of the formula (1), process for their preparation and their use for coloring plastic materials and for preparing automotive paints for metallic coatings.

5 Claims, No Drawings

PIGMENTS OF THE QUINACRIDONEQUINONE SERIES, PROCESS FOR THEIR PREPARATION AND THEIR USE

The invention provides new pigments of the quinacridonequinone series which have very good light and weathering fastness properties, a process for their preparation and their use for coloring plastic materials and in particular for preparing automotive paints.

Quinacridonequinones of the general formula QQ mentioned hereinafter have been known for a relatively long time (Sharvin, J. Russ. Phys. Chem. Ges. 47, 1260 (1915); Lesnianski, Ber. 51, 695 (1918)), but, owing to their extremely poor light and weathering fastness, they have not found any utility as pigments.

However, developments in recent years have led to pigments based on quinacridonequinone which are of great importance with respect to their light and weathering fastness and coloristic properties. The principle of these improved pigments is based on a mix-crystal formation of the quinacridonequinones of the general formula QQ with quinacridones of the general formula Q and dihydroquinacridones of the general formula DQ (U.S. Pat. No. 3,686,009, U.S. Pat. No. 3,748,162).

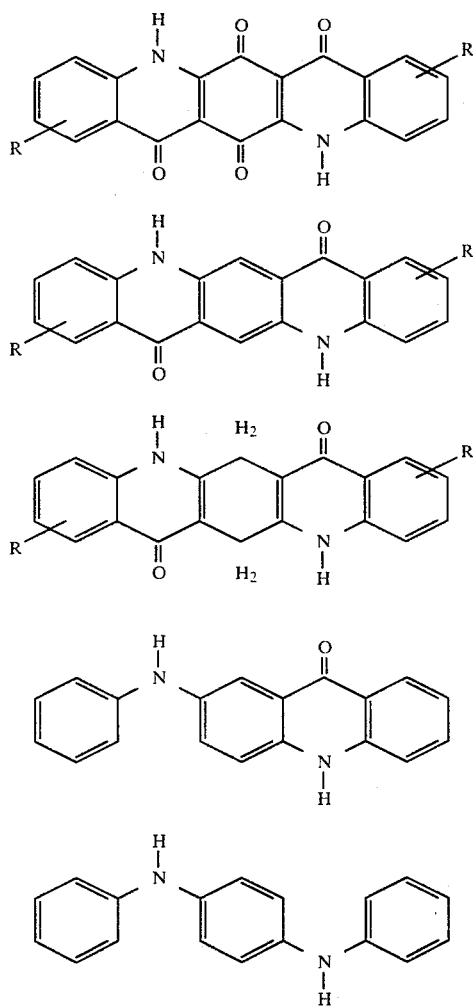

Moreover, by adding (about 10% by weight) of 2-anilinoacridone of the abovementioned formula A and N,N'-diphenyl-p-phenylenediamine of the abovementioned formula P (U.S. Pat. No. 4,286,998, U.S. Pat. No. 3,341,345) it is possible to obtain a distinct improvement in the light and weathering fastness properties of quinacridonequinone pigments.

A mix-crystal is here to be understood as meaning that one or more added components are present in a crystal lattice of a "host" compound. The X-ray diffraction diagram of a mix-crystal then only shows the (in many cases expanded) crystal lattice of the host compound, while in the diagram of the corresponding mechanical mixture all components are detectable.

It has now been found that incorporation of 7,15-dihydropyrido (2,1-b)-(1',2'; 1,2)-pyrimido (4,5-g)-quinazoline-7,15-diones of the general formula (B)

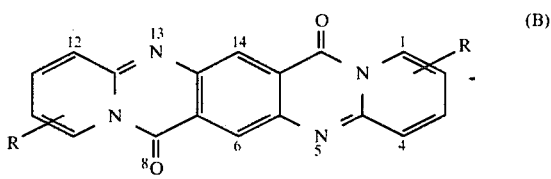

in which R denotes a hydrogen or chlorine atom or a methyl group (Altiparmakian, Helv. Chim. Acta 61, 1146 (1978); Yokoyama, Bull. Chem. Soc. Jpn. 51, 1901 (1978)), in the lattice of quinacridonequinones of the said general formula QQ or in mix-crystals of quinacridonequinones and quinacridones of the said general formula Q even in amounts of 2-5% leads in the case of the resulting pigments to a distinct improvement in their light and weathering fastness.

The present invention thus relates to new pigments of the quinacridonequinone series, comprising 99-30 mole percent of a quinacridonequinone of the general formula (1)

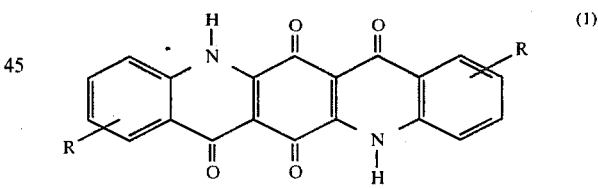

in which R denotes a hydrogen or chlorine atom or a methyl group, 0-60 mole percent of a quinacridone of the general formula (2)

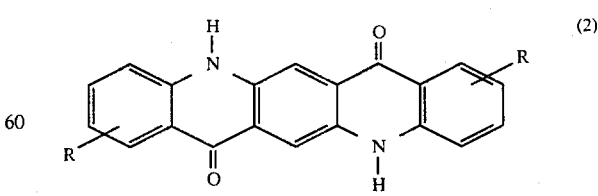

in which R has the abovementioned meaning, and 1-10 mole percent of a 7,15-dihydro-pyrido-(2,1-b)-(1',2'; 1,2)-pyrimido-(4,5-g)-quinazoline-7,15-dione of the general formula (3)

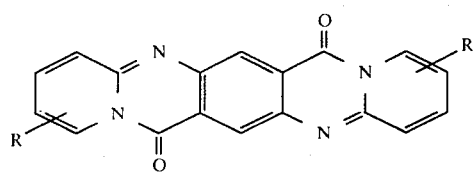

(3)

in which R has the abovementioned meaning, the added compounds of the formulae (2) and (3) being present in the crystal lattice of the quinacridonequinone of the formula (1), and to a process for their preparation by dissolving the components of the abovementioned general formulae (1), (3) and, where appropriate, (2) in 5 to 20 times the amount by weight of 96–100% strength sulfuric acid at temperatures of 0° to 40° C. and subsequently discharging the solution onto 5 to 15 times the amount by weight of water at 0° to 30° C., based on the weight of the sulfuric acid used, and to their use for coloring plastic materials and in particular for preparing automotive paints for metallic coatings.

Particularly valuable new pigments of the quinacridonequinone series are those which comprise 99–75 mole percent of a quinacridonequinone of the formula

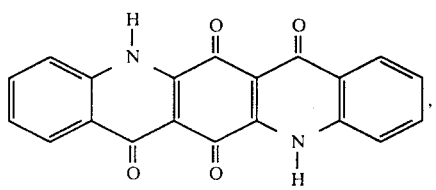

0 to 15 mole percent of a quinacridone of the formula

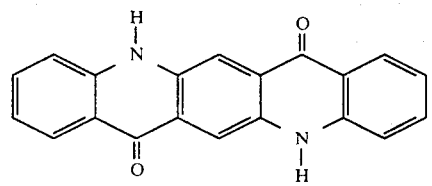

and 1–10 mole percent of a 7,15-dihydro-pyrido-(2,1-b)-(1′,2′; 1,2)-pyrimido-(4,5-g)-quinazoline-7,15-dione of the formula

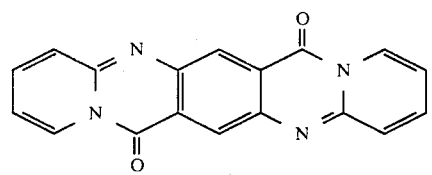

the two lastmentioned compounds being present in the crystal lattice of the quinacridonequinone (these new pigments produce golden hues in metallic automotive coatings) and those which comprise 54–25 mole percent of a quinacridonequinone of the formula

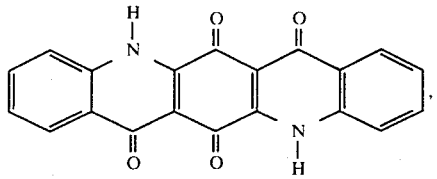

45–65 mole percent of a quinacridone of the formula

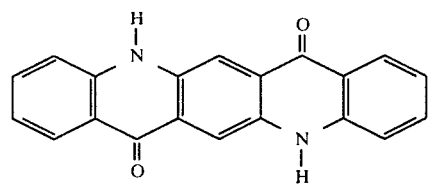

and 1–10 mole percent of a 7,15-dihydro-pyrido-(2,1-b)-(1′,2′; 1,2)-pyrimido-(4,5-g)-quinazoline-7,15-dione of the formula

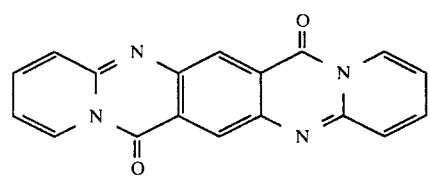

the two lastmentioned compounds being present in the crystal lattice of the quinacridonequinone (these new pigments produce maroon hues in metallic automotive coatings).

On using larger amounts of compounds of the stated general formulae (2) or (3), the compounds can partially also be present outside the crystal lattice of the compounds of the stated general formula (1).

The use of compounds of the formula (3) for improving the light and weathering fastness properties of quinacridonequinone pigments is new and, compared with the previously mentioned compounds (6,13-dihydroquinacridone (DQ), 2-anilinoacridone (A) and N,N′-diphenyl-p-phenylenediamine (P)), has the advantages described hereinafter.

The compounds 6,13-dihydroquinacridone of the formula DQ, 2-anilinoacridone of the formula A and N,N′-diphenyl-p-phenylenediamine of the formula P and their pigments, which, as mentioned above, have recently been preferably used for improving the light and weathering fastness properties of quinacridonequinone pigments, are basically structurally closely related to the quinacridone Q. For instance, the two lastmentioned compounds can be formally derived from the quinacridone of the formula Q through the loss of either or both carbonyl functions. They furthermore all have two N—H functions, which undoubtedly favor mix-crystal formulation with the quinacridonequinones of the formula QQ.

It was therefore all the more surprising that compounds of the formula B, which have no N—H functions and, in addition, have a molecular structure different from quinacridone, likewise, like the compounds of the formulae DQ, D, A and P, improve the light and weathering fastness of quinacridonequinones. Since 6,13-dihydroquinacridones of the formula DQ, 2- anilinoacridone of the formula A and other p-phenylenediamine derivatives are colorless or only slightly colored compounds, their addition (in practice up to 10% by weight) understandably reduces the coloring strength compared with the untreated pigments. The synthesis of mix-crystals based on quinacridonequinone using compounds of the formula B, which are themselves colored pigments, produces pigment compositions which are superior to the known pigment compositions in terms of coloristic properties and coloring strength. Furthermore, significantly smaller amounts of compounds of the formula B than, for example, of 6,13-dihydroquinacridone are sufficient for obtaining the light and weathering fastness properties required in the field.

It may also be mentioned that the synthesis of compounds such as 2-anilinoacridone requires a relatively high expenditure, while to synthesize compounds of the formula B from 3,6-dihydro-2,5-dihydroxyterephthalic acid esters and 2-aminopyridines it is possible to use apparatuses of the type also used in the synthesis of quinacridones.

The synthesis of the mix-crystals is effected in a known manner (U.S. Pat. No. 3,298,847, U.S. Pat. No. 3,607,336), preferably by dissolving the components at 0° to 40° C. in 6 to 10 times the amount by weight of 96 to 100% strength sulfuric acid and subsequently hydrolyzing by discharging the sulfuric acid solution onto 5 to 10 times the amount by weight (based on the sulfuric acid used) of water at 0° to 10° C., preferably ice-water. It is further possible to add the compound of the formula B or the intermediate 2,4-di-(2-aminopyridyl)-terephthalic acid during the synthesis of the quinacridonequinones of the formula QQ and of the quinacridones of the formula Q.

The pigments thus obtained can be brought into the form required in the field by known methods of finishing and conditioning (cf. for example U.S. Pat. No. 4,286,998; German Auslegeschrift 2,016,078).

EXAMPLES (1a)

16.5 g (48.3 mmol) of the compound of the abovementioned formula (1) (R=H) and 0.8 g (2.55 mmol) of the abovementioned formula (3) (R=H) are dissolved at at most 20° C. in 150 g of 96% strength sulfuric acid. The solution obtained is added to 750 g of ice-water. The precipitated suspension is heated at 90° to 95° C. for 2 hours. Filtering off with suction, washing and drying gives 17.1 g of a golden yellow pigment.

(2a)

16.8 g (49.1 mmol) of the compound of the abovementioned formula (1) (R=H), 1.8 g (5.77 mmol) of the compound of the abovementioned formula (2) (R=H) and 0.9 g (2.87 mmol) of the compound of the abovementioned formula (3) (R=H) are dissolved in 160 g of 96% strength sulfuric acid and, through addition to 800 g of ice-water, are hydrolyzed. Working up as described in Example (1a) gives 19.1 g of a reddish golden pigment of very good light and weathering fastness in automotive paints.

(3a)

7.5 g (21.9 mmol) of the compounds of the abovementioned formula (1) (R=H), 10.3 g (33.1 mmol) of the compound of the abovementioned formula (2) (R=H) and 0.45 g (1.43 mmol) of the compounds of the abovementioned formula (3) (R=H) are dissolved in 180 g of 96% strength sulfuric acid, and are hydrolyzed through addition to 900 g of ice-water, and the product is worked up as described in Example (1a). This gives 18.0 g of a maroon-colored pigment of excellent light and weathering fastness in automotive paints.

The numbers quoted in the tabulated examples below underneath the compounds (1), (2) and (3) are molar ratios. ΔE is a measure of the change of the color locus after weathering relative to the unweathered sample (TSA paint system; ®XENOTEST X 1200 W from ORIGINAL HANAU HERAEUS GMBH), the rule being: the higher this value after a certain time, the poorer the light and weathering fastness of the pigment tested.

Examples 5a and 5b show the superiority of the compound of the formula (3) over dihydroquinacridone (DQ) (U.S. Pat. No. 3,686,009) in the improvement of the light and weathering fastness of quinacridonequinone pigments.

TABLE

| Example | Compound (1) (R =) | Compound (2) (R =) | Compound (3) (R =) | Color | ΔE (after × hours) 1:1 TiO$_2$ brightening |
|---|---|---|---|---|---|
| 1a | 95 (R = H) | 0 | 5 (R = H) | golden yellow | 4.0 (400 h) |
| 1b | 90 (R = H) | 0 | 10 (R = H) | golden yellow | 2.0 (500 h) |
| 1c | 100 (R = H) | 0 | 0 | yellow | 12 (500 h) |
| 2a | 85 (R = H) | 10 (R = H) | 5 (R = H) | golden | 0.7 (1500 h) |
| 2b | 92 (R = H) | 5.5 (R = H) | 2.5 (R = H) | golden | 1.2 (1500 h) |
| 2c | 89 (R = H) | 11 (R = H) | 0 | golden | 1.9 (1500 h) |
| 3a | 38 (R = H) | 57 (R = H) | 5 (R = H) | maroon | 0.6 (2000 h) |
| 3b | 39 (R = H) | 58.5 (R = H) | 2.5 (R = H) | maroon | 0.6 (2000 h) |
| 3c | 40 (R = H) | 60 (R = H) | 0 | maroon | 1.1 (2000 h) |
| 4a | 91 (R = 2,9-CH$_3$) | 0 | 9 (R = 2,10-CH$_3$) | golden yellow | 2.4 (500 h) |
| 4b | 100 | 0 | 0 | yellow | 6.3 (500 h) |

| Example | Compound (1) (R = H) | Compound (2) (R = H) | DQ (R = H) | Compound (3) (R = H) | ΔE (after × hours) |
|---|---|---|---|---|---|
| 5a | 85 | 5 | 10 | 0 | 3.5 (2000 h) |
| 5b | 85 | 5 | 0 | 10 | 1.9 (2000 h) |

We claim:

1. A pigment of the quinacridonequinone series comprising 99–30 mole percent of a quinacridonequinone of the formula (1)

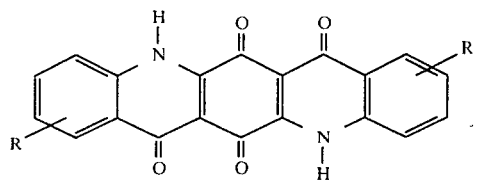

in which R denotes a hydrogen or chlorine atom or a methyl group, 0–60 mole percent of a quinacridone of the formula (2)

in which R has the abovementioned meaning, and 1–10 mole percent of a 7,15-dihydro-pyrido-(2,1-b)-(1',2'; 1,2)-pyrimido-(4,5-g)-quinazoline-7,15-dione of the formula (3)

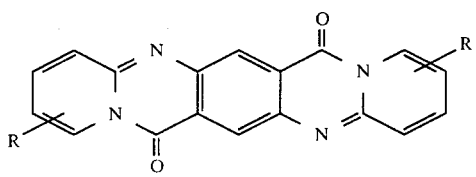

in which R has the abovementioned meaning, the added compounds of the formulae (2) and (3) being present in the crystal lattice of the quinacridonequinone of the formula (1).

2. A pigment of the quinacridonequinone series comprising 99 to 75 mole percent of a quinacridonequinone of the formula

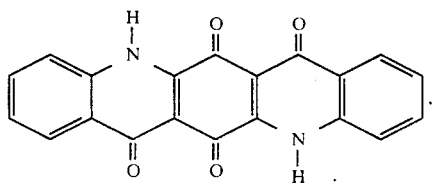

0–15 mole percent of a quinacridone of the formula

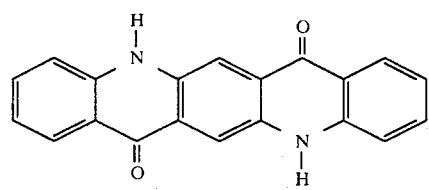

and 1–10 mole percent of a 7,15-dihydro-pyrido-(2,1-b)-(1',2'; 1,2)-pyrimido-(4,5-g)-quinazoline-7,15-dione of the formula

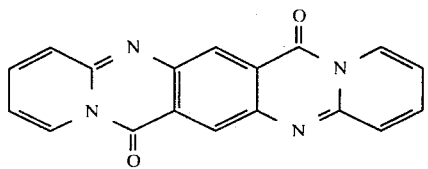

the two lastmentioned compounds being present in the crystal lattice of the quinacridonequinone.

3. A pigment of the quinacridonequinone series comprising 54–25 mole percent of a quinacridonequinone of the formula

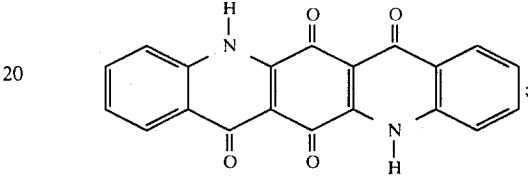

45–65 mole percent of a quinacridone of the formula

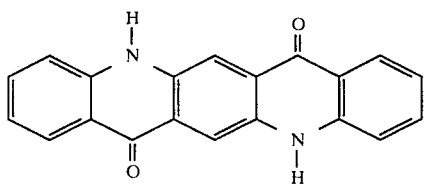

and 1–10 mole percent of a 7,15-dihydro-pyrido-(2,1-b)-(1',2'; 1,2)-pyrimido-(4,5-g)-quinazoline-7,15-dione of the formula

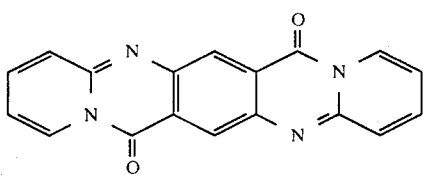

the two lastmentioned compounds being predominantly present in the crystal lattice of the quinacridonequinone.

4. A process for preparing pigments of the quinacridonequinone series comprising 99–30 mole percent of a quinacridonequinone of the formula (1)

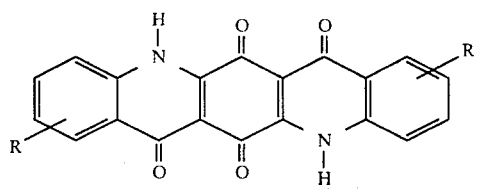

in which R denotes a hydrogen or chlorine atom or a methyl group, 0–60 mole percent of a quinacridone of the formula (2)

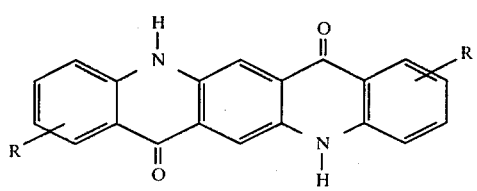

in which R has the abovementioned meaning, and 1–10 mole percent of a 7,15-dihydro-pyrido-(2,1-b)-(1',2'; 1,2)-pyrimido-(4,5-g)-quinazoline-7,15-dione of the formula (3)

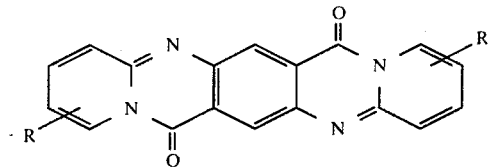

in which R has the abovementioned meaning, which comprises dissolving the components of the stated formulae (1), (3) and, where appropriate, (2) in 5 to 20 times the amount by weight of 96–100% strength sulfuric acid at temperatures of 0° to 40° C. and subsequently discharging the solution onto 5 to 15 times the amount by weight of water at 0° to 30° C., based on the weight of the sulfuric acid used.

5. Use of the pigment mentioned in claim 1, for coloring plastic materials and for preparing automotive paints for metallic coatings.

* * * * *